G. REKERS.
ELECTROMAGNETIC RETAINING DEVICE.
APPLICATION FILED MAR. 31, 1911.

1,075,441.

Patented Oct. 14, 1913.
7 SHEETS—SHEET 1.

WITNESSES:
George T. Whitney.
Sherman A. Benedict.

INVENTOR
Gerret Rekers
BY
Lyman E. Dodge
ATTORNEY

G. REKERS.
ELECTROMAGNETIC RETAINING DEVICE.
APPLICATION FILED MAR. 31, 1911.

1,075,441.

Patented Oct. 14, 1913.

WITNESSES:
George T. Whitney.
Sherman A. Benedict

INVENTOR
Gerret Rekers
BY
Lyman E. Dodge
ATTORNEY

G. REKERS.
ELECTROMAGNETIC RETAINING DEVICE.
APPLICATION FILED MAR. 31, 1911.

1,075,441.

Patented Oct. 14, 1913.

WITNESSES:
George T. Whitney.
Sherman A. Benedict

INVENTOR
Gerret Rekers
BY
Lyman E. Dodge
ATTORNEY

G. REKERS.
ELECTROMAGNETIC RETAINING DEVICE.
APPLICATION FILED MAR. 31, 1911.

1,075,441.

Patented Oct. 14, 1913.

WITNESSES:
George J. Whitney.
Sherman A. Benedict.

INVENTOR
Gerret Rekers.
BY
Lyman E. Dodge
ATTORNEY

G. REKERS.
ELECTROMAGNETIC RETAINING DEVICE.
APPLICATION FILED MAR. 31, 1911.

1,075,441.

Patented Oct. 14, 1913.

WITNESSES:
George T. Whitney
Sherman A. Benedict

INVENTOR
Gerret Rekers
BY
Lyman E. Dodge
ATTORNEY

G. REKERS.
ELECTROMAGNETIC RETAINING DEVICE.
APPLICATION FILED MAR. 31, 1911.

1,075,441.

Patented Oct. 14, 1913.

Fig. 2D.

UNITED STATES PATENT OFFICE.

GERRET REKERS, OF ROCHESTER, NEW YORK, ASSIGNOR TO GENERAL RAILWAY SIGNAL COMPANY, OF GATES, NEW YORK, A CORPORATION OF NEW YORK.

ELECTROMAGNETIC RETAINING DEVICE.

1,075,441.      Specification of Letters Patent.      Patented Oct. 14, 1913.

Application filed March 31, 1911. Serial No. 618,197.

*To all whom it may concern:*

Be it known that I, GERRET REKERS, a citizen of the United States, and resident of the city of Rochester, in the county of Monroe and State of New York, have invented a new and useful Electromagnetic Retaining Device, of which the following is a specification.

This invention relates to an electro-magnetic retaining device.

The primary object of this invention is to so construct an electro-magnetic retaining device, that there is absolutely no liability for it to become "locked" in retaining position when the energizing current ceases.

A further object of the invention is to produce a magnetic retaining device which is capable of resisting a large torque with the expenditure of a very small amount of electrical energy.

A further object of the invention is to so construct an electro-magnetic retaining device that the consumption of electrical energy by the device will be large if the torque to be resisted is large but will automatically be reduced if the torque to be resisted is small.

The invention consists in the idea of means, the physical embodiment of which herein shown, described and claimed together with modifications shown and described of the generic idea constitutes the different forms of embodiment of my invention.

The prior art discloses many and diverse forms of magnetic retaining devices associated with mechanical parts having rotary motion, but they may be characterized as "contact" devices, that is, the part corresponding to the armature is at some period of time in its operation in actual contact either with the poles of the magnet employed or in contact with an interposed non-magnetic body. The armature has moreover a longitudinal movement as well as a rotary, the longitudinal movement being controlled in one direction by the energization of the electro-magnet and in the other either by springs or some other "unlocking" device.

In all of such devices the armature is liable to become "locked" in operative position either because of residual magnetism or because of failure of the "unlocking" parts to act. In cases where a failure to properly "unlock" is dangerous such devices cannot be used although highly desirable by reason of their peculiar properties. In applicant's invention the armature is completely "unlocked" by the mere breaking of the current which energizes the electro-magnet, without being followed by a particular motion of the armature, and there is absolutely no opportunity to become "locked", there is furthermore always an intervening air gap between the armature and field, which can be destroyed only by the destruction of the mechanism itself.

In order that my invention may be rendered more readily comprehensible, I have described the same in this specification in such full, clear, concise, and exact terms that any one skilled in the art may readily understand the principle underlying the same and the preferred mode of its application, supplementing my description by full and clear drawings of the structures described, in which the different parts are designated by characters of reference and in which similar characters refer to like parts; a brief description of the figures of the drawing being as follows:

Figure 1:
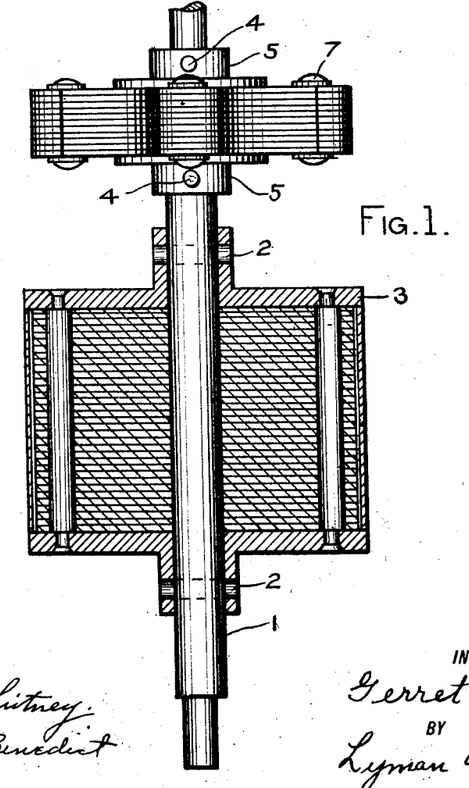
Figure 1 is a cross sectional view of the squirrel cage armature of an induction motor, with the rotating part of my retaining device rigidly attached to the shaft thereof.
Figure 15:
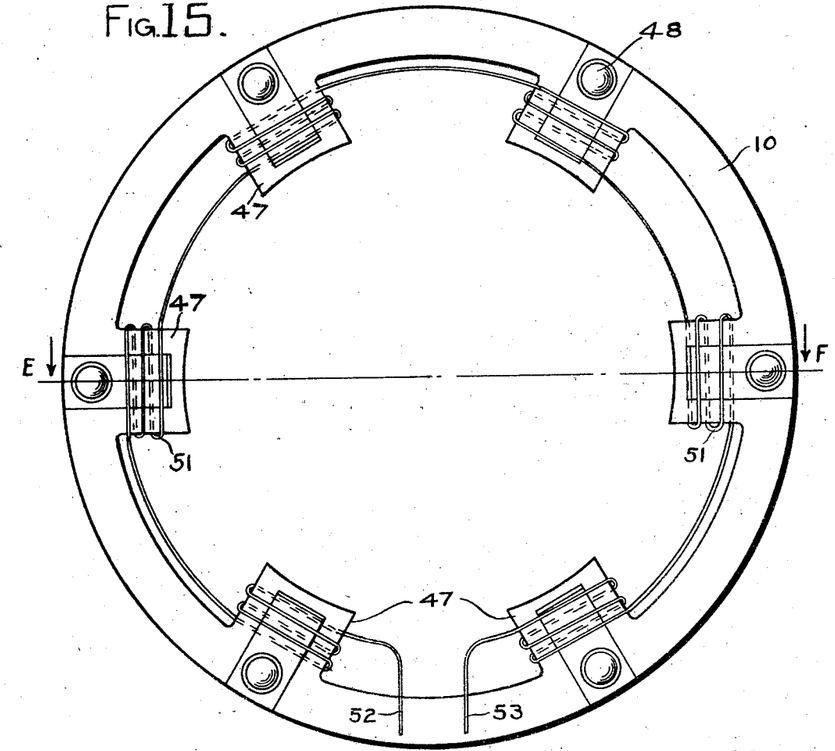
Fig. 15, is an end view of the fixed element of my invention.

*Construction.*—1, designates a shaft, on which is fastened by means of pins 2, the squirrel cage armature 3 of ordinary and well known construction; 4 designates pins which rigidly attach the collars 5 to the shaft 1; 6 designates a member made in a form approximating a star, consisting of a large number of thin sheets of magnetic material separated one from the other by a layer of core plate varnish or similar dielectric material made to adhere to the sides of each, and all firmly held together by the rivets 7, which are also electrically insulated in the well known manner by placing a wrapper of paper or similar dielectric material about their body. The star wheel is rigidly attached to the collars 5 by means of the rivets 8, which are also insulated in the same manner as rivets 7, and in order to complete the structure in the manner well known and approved by best electrical engineering practice a layer of paper or similar dielectric material is placed between the shaft 1 and the star wheel 6. The star wheel as shown in Fig. 2, has six limbs 9, spaced equal angular distances apart and the diametrical distance from the extreme tip of one limb to the extreme tip of a diametrically opposite limb is such that the star wheel may be placed in and revolve in the annular field 10, as shown in Fig. 15, leaving only a small air gap between the ends of the limbs of the star wheel 6 and the curved faces of the poles 47.

Figures 2, 18:
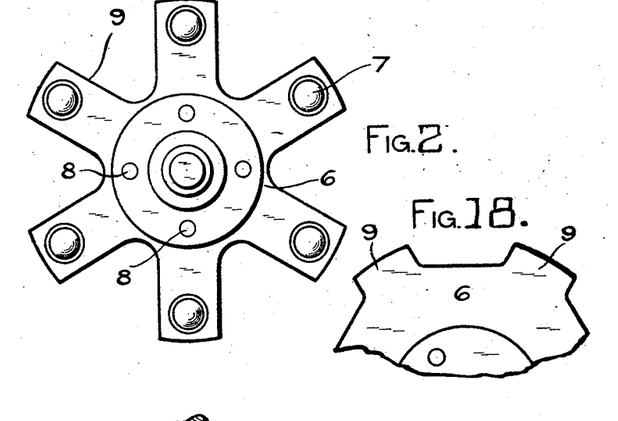
Fig. 2, is an end view of the rotating members of my invention.
Figs. 17, 18 and 19 are views of modifications of details.
Figures 3, 4, 19:
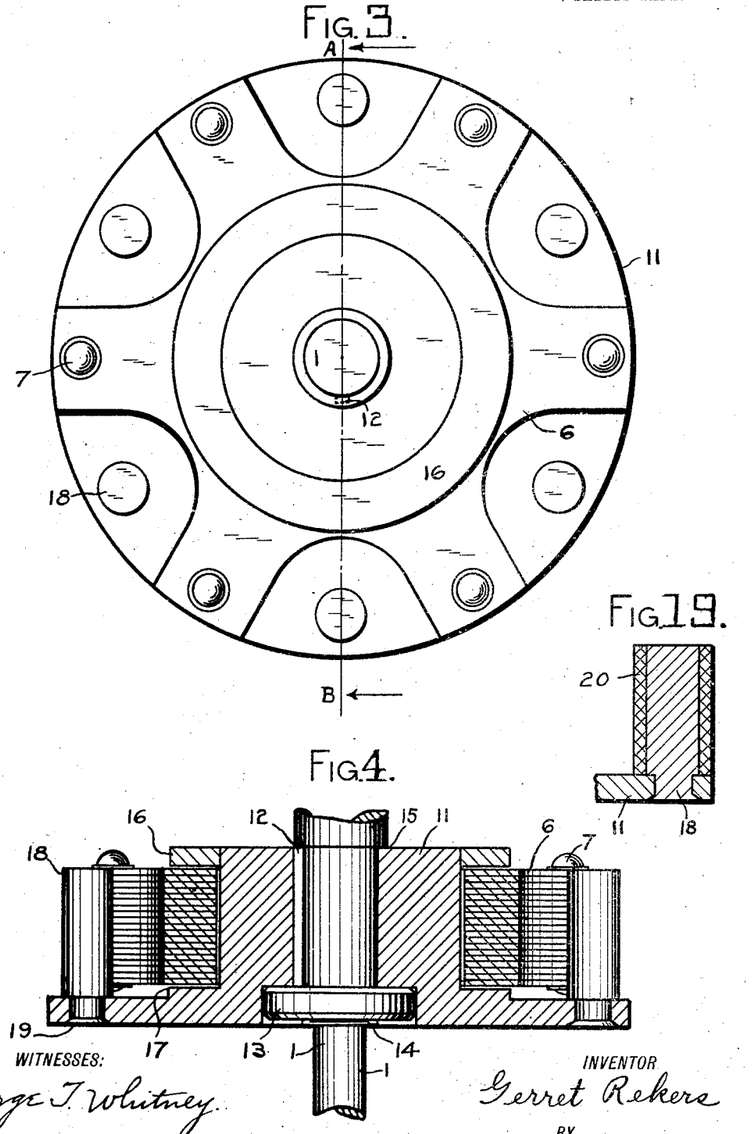
Fig. 3, is an end view of another form of my invention.
Fig. 4, is a cross sectional view of the form shown in Fig. 3, on the line A—B viewed in the direction of the arrows.

Figs. 3 and 4 represent a construction of star wheel 6 similar to Figs. 1 and 2, but as shown in these views the star wheel is not rigidly attached to the shaft 1, but is loosely mounted for slight rotative movement upon hub 11, which hub 11 is rigidly fastened to shaft 1, by the key 12 which prevents rotative movement thereon and by the internally screw threaded nut 13, which turns upon a screw thread 14 formed on the shaft and binds the hub 11 firmly against the shoulder 15 on the shaft and thus prevents longitudinal movement thereof. The hub 11 also bears a collar 16 which, together with the shoulder 17 retains the star wheel 6 so that it may not move longitudinally of the shaft or hub. Between each adjacent limb of the star wheel a stud 18 projects from the hub, said stud having a reduced end which is passed through the hub 11 and riveted in place as most clearly shown in Fig. 4, in which 19 designates the riveted end.

The construction above described allows the star wheel to rotate freely about the hub except in so far as it is restrained by a limb of the star wheel engaging with the stud on either side thereof.

Fig. 19 is a detail view of a stud 18 fastened to a hub 11, having an annular member 20 thereabout, said annular member being constructed preferably of rubber or other resilient material.

Figure 5:
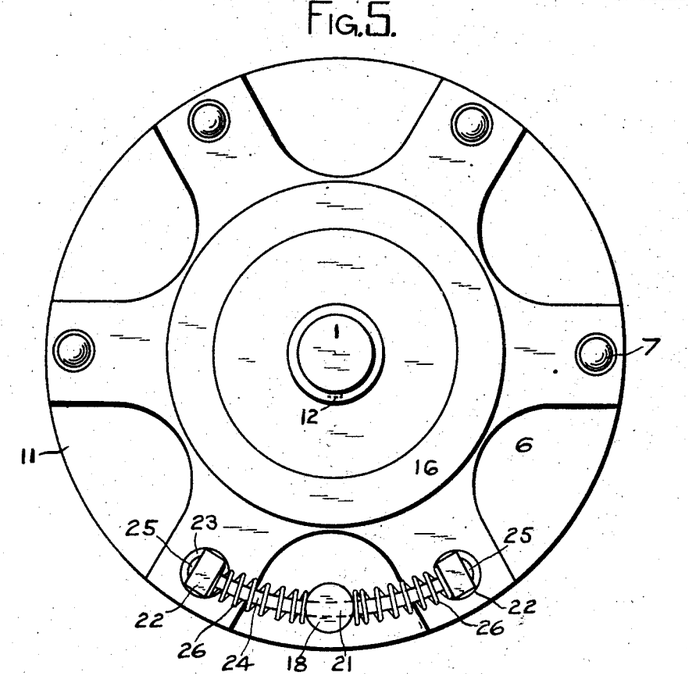
Fig. 5, is an end view of another form of my invention.
Figure 6:
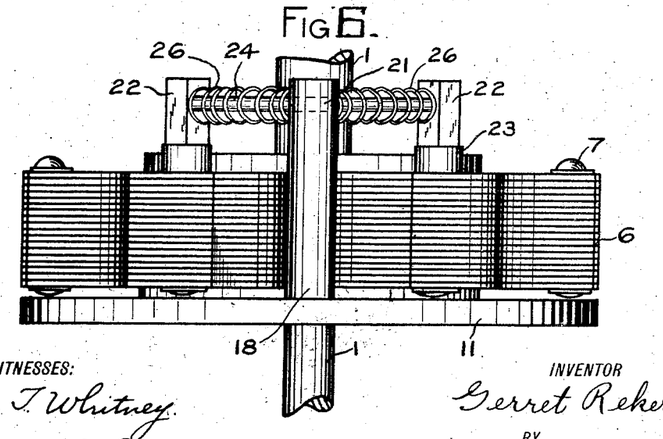
Fig. 6, is a plan view of the form shown in Fig. 5.

Figs. 5 and 6 represent a construction similar to Figs. 3 and 4, only one stud 18 being employed however, a curved hole 21, being formed in the outer end of the stud, best shown in Fig. 6, through which a curved rod 24 is loosely inserted, the two ends of the rod being passed through studs 22, and then headed, as at 25. The studs 22 each pass through a limb of the star wheel 6 and are headed on the other end and bear a shoulder 23 just below the outer end thus serving as a rivet to hold the laminations of the star wheel together. A helical compression spring 26 is placed between the stud 18 and the studs 22 on either side, being prevented from displacement by the presence of the curved rod 23 passing therethrough.

The construction above described causes hub 11 and star wheel 6 to be constantly resiliently held from relative rotative movement in either direction.

Figs. 7 to 12 inclusive, represent a construction and details of the same in which the star wheel has interposed between it and the shaft 1, a ball clutch member. The center of the star wheel 6 is removed and a hub member 11 is inserted therein and fastened rigidly thereto, which hub member 11 has a central hole therein into which is rigidly fastened the ball race 27; 28 designates a circular groove in the inside face of the ball race 27, in which rest balls 29; 30 designates a cup in which the ball rests and which has a shank 31, best shown in Fig. 12, which shank has a helical spring 32, about it, which presses at one end against the back face of the cup 30, and at the other rests in a hole 33, in an inner clutch member 34, which is rigidly fastened to the shaft 1 by means of a key inserted in the keyway 35. The inner clutch member 34 has a groove 36 in the periphery thereof of varying depth so that the ball 29 when resting at different points on the bottom of this groove, either does not project at all beyond the periphery of the inner clutch member or projects different distances beyond the same. The helical spring 32 acting through cup 30 constantly tends to project the ball 29 into that part of the groove at which it will project the most beyond the periphery of the inner clutch member 34, and into engagement with the groove 28 in the ball race 27.

Figure 7:
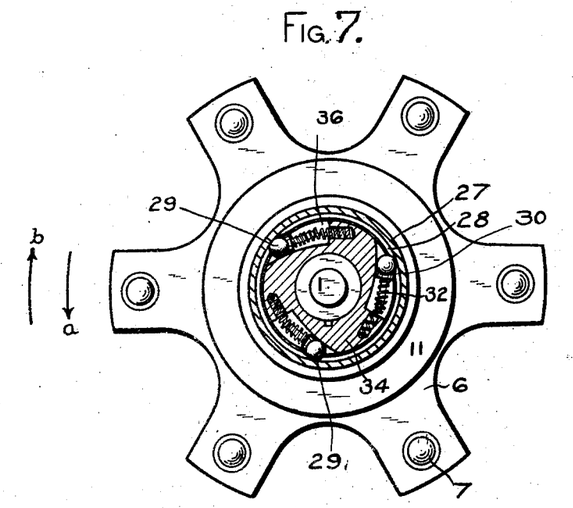
Fig. 7, is an end view, partly in section of another form of my invention.
Figure 8:
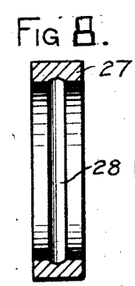
Figs. 8, 9, 10, 11 and 12 are views showing details of the form shown in Fig. 7.
Figure 9:
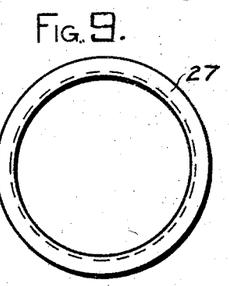
Figures 10, 11:
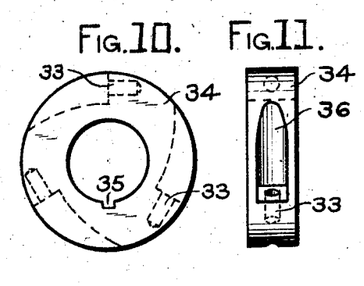
Figure 12:
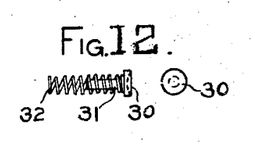

The result of the above described construction is that shaft 1 and inner clutch member 34 can move independently of ball race 27 and star wheel 6 to which it is rigidly attached in the direction of the arrow *a*, as shown in Fig. 7, but all parts must revolve together when shaft 1 revolves in the direction of arrow *b* in the same figure, for when shaft 1 revolves in the direction of arrow *a*, the balls 29 tend to move to the deeper part of groove 36 and so free themselves from the groove 28 in ball race 27, but when the shaft 1 revolves in the direction of the arrow *b*, the balls tend to move to the shallow portion of the groove and thus tend to bind ball race 27 and inner clutch member 34 together.

Figure 13:
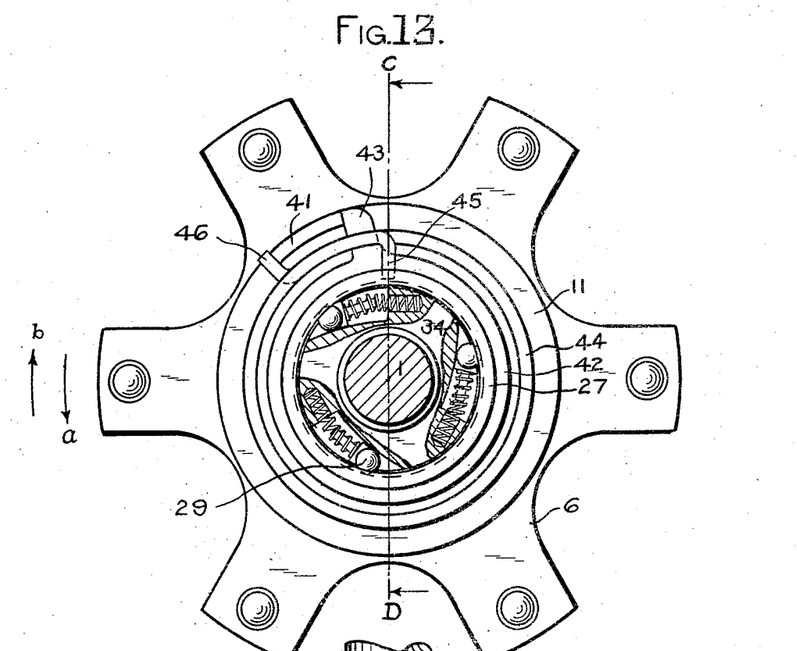
Fig. 13, is an end view of another form of my invention.
Figure 14:
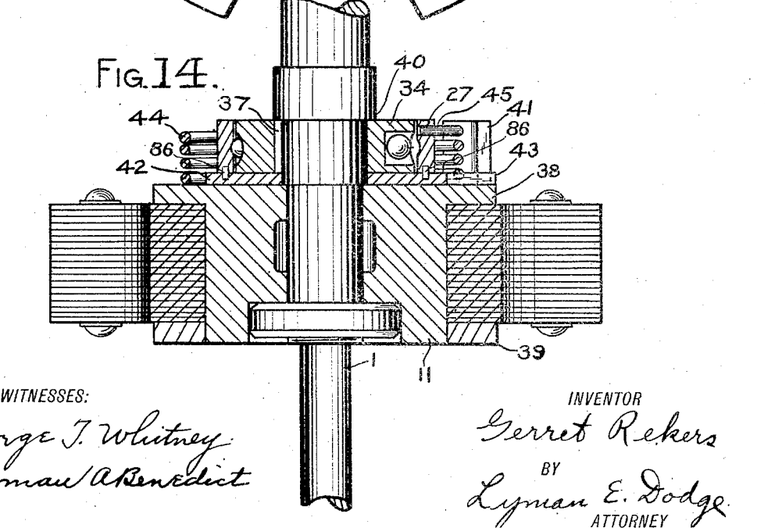
Fig. 14, is a cross sectional view of the form shown in Fig. 13 on the line C—D viewed in the direction of the arrows.

Figs. 13 and 14 represent a construction in which the inner ball clutch member 34 is attached to shaft 1, by key 37, so that it must revolve therewith. The hub 11 carrying the star wheel rigidly attached thereto, the same being bound between integral shoulder 38 and removable collar 39, is mounted so that it may revolve freely on shaft 1, but held from longitudinal movement thereon by being placed between nut 13 and inner clutch member 34, the other side of the inner clutch member bearing against a shoulder 40 on the shaft so as to prevent longitudinal movement in that direction. Between the inner clutch member 34 and the hub 11 is an annulus 42 which is fastened rigidly to ball race 27 by pins 86 and bears a projecting stop arm 43, which is in the path of stop 41 rigidly attached and projecting from hub 11. A helical torsion spring 44 is wound about ball race 27 one end thereof being bent at a right angle at 45 and inserted in a hole in the ball race 27, the other end thereof being bent at a right angle as at 46 and engaged with one side of the stop 41, the spring when in place creating a torsional strain to keep stops 41 and 43 together as shown in Fig. 13. The inner member of the ball clutch when revolved in the direction of arrow *a* transmits no motion to the ball race 27, a movement in the direction of arrow *b*, however, causes the ball race to turn in the direction of arrow *b* which in turn causes spring 44 to be wound up, or looked at from a different point of view, causes end 45 to become more widely separated from end 46, thus, through end 46 and stop 41 causes hub 11 and star wheel 6 to turn with the shaft, as soon as the torque exerted by the spring equals any force exerted upon star wheel 6 to prevent the same turning.

Figure 16:
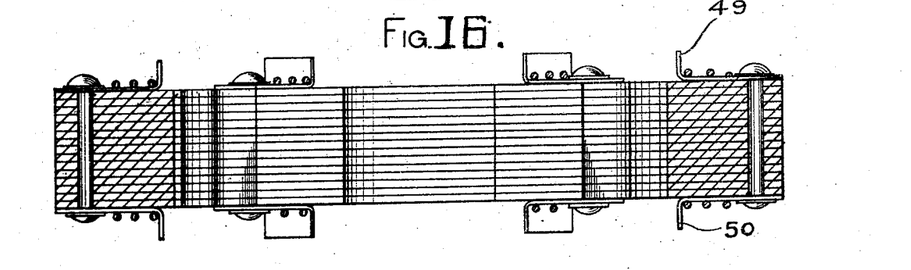
Fig. 16, is a cross sectional view of the form shown in Fig. 15 on the line E—F viewed in the direction of the arrows.

Figs. 15 and 16 represent a field of magnetic material, the same being constructed of thin pieces of magnetic material and held together by rivets exactly as was the star wheel hereinbefore described. The ring 10 has inwardly projecting poles 47, spaced an equal angular distance apart, which distance is equal to the angular distance at which the limbs 9 of the star wheel are spaced apart, and the angular distance across the face of the poles is equal to the angular distance across the face of the limbs 9 of the star wheel. The rivets 48 holding the field together are placed opposite the poles and also retain two brass strips 49 and 50, which have their inner ends outwardly bent to retain the coils 51, which are placed upon each pole, in place. The coils or windings 51 are placed on each pole and connected together in series, there being two terminal wires 52 and 53 to connect with a source of electrical energy, and the wire is so wound upon the poles that when energized by a flow of current through the windings, adjacent poles will be of opposite polarity.

Instead of having the limbs 9 of the star wheel 6 project quite a distance from the body of the wheel, I may construct the wheel as shown in Fig. 18, in which figure is shown a star wheel having but a very slight cut-away portion between the limbs 9. The advantage of this construction is that a shorter path for the magnetic lines of force is furnished thus reducing the reluctance and correspondingly increasing the effect.

Figure 17:
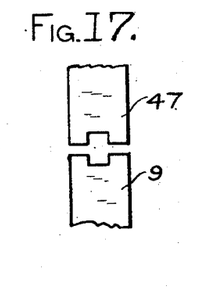

Instead of having the pole faces plain, I may slot them as shown in Fig. 17, this construction being very desirable when direct current is used in the windings 51, as it largely increases the holding effect.

Figure 20:
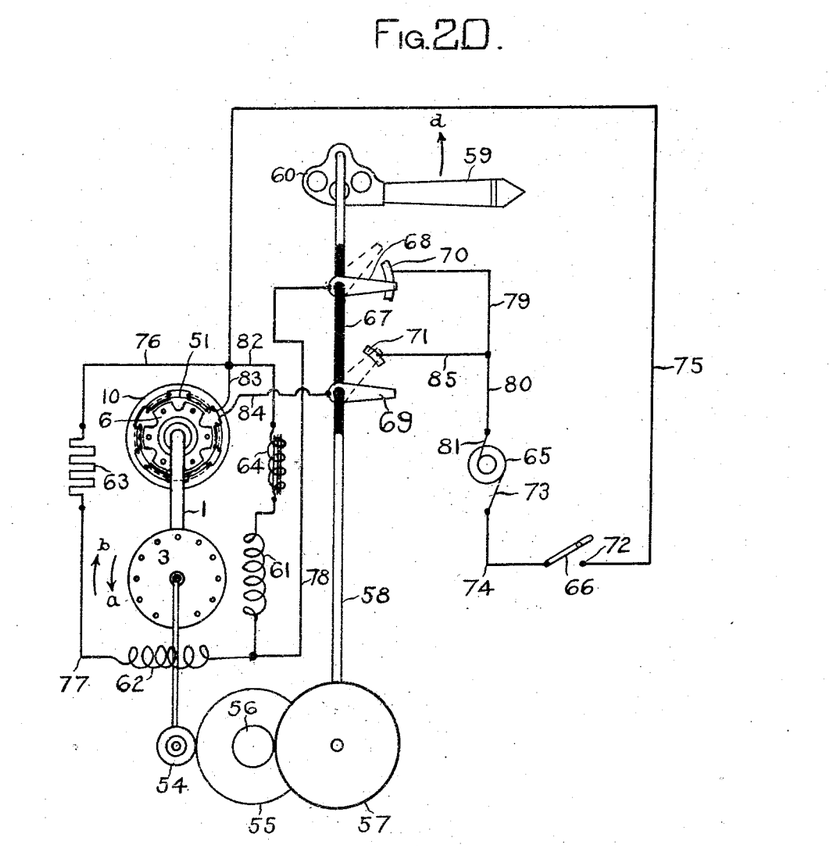
Fig. 20, is a diagrammatic view showing one form of circuit employed in carrying out my invention.

In Fig. 20, 3 is the squirrel cage armature of an induction motor, mounted on the shaft 1, which shaft has a pinion 54 connected to its outer end which meshes with a gear wheel 55, which has a pinion 56 rigidly attached thereto meshing with a gear wheel 57 fastened on a shaft 58 which bears at its other end the arm 59, which is here represented as the blade of a signal fastened to a casting 60; 61 and 62 designate the two field coils displaced in space, as is the construction ordinarily employed in polyphase induction motors; 63 is a non-inductive resistance in series with field coil 62, and 64 is a reactance in series with field coil 61; 10 designates the field of the retaining device and 6 designates the armature thereof which is attached by means of the mechanism shown in Figs. 13 and 14 to the shaft; 65 designates a source of alternating current; 66 designates an ordinary hand switch. Upon the shaft 58 is placed insulating material 67 which has attached to it the arms 68 and 69, the first mentioned arm 68 contacts with metallic strip 70 in the position of the arm shown, but breaks contact with the strip 70 upon a sufficient oscillation of the shaft 58. The arm 69 is, as shown in Fig. 20, out of contact with metallic strip 71, but is so placed upon shaft 58 as to make contact with metallic strip 71 at the time arm 68 breaks contact with strip 70.

*Operation.*—If hand switch 66 is closed upon contact 72, current flows in the following path: brush 73, wire 74, switch 66, contact 72, wire 75, wire 76, non-induction resistance 63, wire 77, field 62, wire 78, arm 68, strip 70, wire 79, wire 80, to the other brush 81 of the alternating generator 65; at the same time current passes from wire 75 to wire 82 through reactance 64, and field coil 61 to wire 78. By virtue of the current flowing in the two above traced paths, the fields of the motor are energized and the squirrel cage armature is caused to rotate in the direction of the arrow *a* as shown in Fig. 20, and as shown on Fig. 13 which causes the train of gearing and the shaft 58 heretofore described a movement of arm 59 in the direction of the arrow *d*, Fig. 20, which movement continues until arm 68 breaks contact with strip 70 which, of course, causes the motor to stop as the path of the current to the brush 81 is broken. The weight of the arm 59 would then tend to rotate the shaft 58 in the other direction and also move the arm 68 back until it again made contact with strip 70 which would, of course, again cause current to flow through the motor, revolve the armature and again lift the arm, which movements would continue indefinitely or until the circuit was broken at the switch 66. In order to prevent this constant up and down movement and to retain the arm positively in its moved position until the current is cut off at the switch 66, the magnetic retaining device is used, which not only prevents such a movement but also allows the arm to be held in the moved position by an amount of current very much less than would be expended in moving it up and down as heretofore described. When the arm 59 is moved to its upper position and the arm 68 breaks contact with the strip 70, the arm 69 makes contact with strip 71, so that current flows from the source in the following path: brush 73, wire 74, switch 66, contact 72, wire 75, wire 83, coils 51, wire 84, arm 69, strip 71, wire 85, wire 80 and back to the source by brush 81. The current in the above traced path causes a magnetic flux between the field 10 and the armature 6 which holds the armature so that it cannot rotate and thus through the shaft 1 the train of gears and the shaft 58 holds the arm 59 in its moved position.

When the device shown in Figs. 13 and 14 is interposed between the shaft and the star wheel forming the armature of the retaining device the rotation of the motor in the direction of the arrow *a* in Figs. 13 and 20 does not cause a rotation of the star wheel as heretofore explained, so that the star wheel 6 is able to get in line with the poles of the field before the arm 59 is moved to its upper limit, so that when the current is cut off from the motor at arm 68 and current is sent through the fields 51 by the arm 69, making contact with strip 71, the arm 59 will not have to rotate backwardly at all in order to rotate the star wheel into such a position that the limbs of the star wheel will coincide with the poles of the field 10; furthermore, after the operating current has been cut off from the motor, the arm 59 will have a tendency to drop back due to the "back lash" in the train of mechanism between the motor and the arm and in so doing it acquires a certain momentum which might be sufficient to dislodge the star wheel from its position with the limbs in alinement with the pole pieces, and the star wheel once started would be rather difficult to stop, but the spring 44 absorbs the momentum caused by the arm 59 falling back through the "back lash" of the gears and transmits such momentum gradually to the star wheel so that there is no opportunity for the arm 59 to dislodge the star wheel from its position in alinement with the poles of the field. It is to be further observed that with the spring arrangement, even if the star wheel did become moved by the falling back of the arm 59, it would move very gradually and would give the fields 51 time to build up and so hold it before it entirely got without the zone of their influence. When the switch 66 is opened, after the movement and holding of the arm 59 in its upper position as heretofore described, the current flowing through the coils 51 will cease and the weight of the arm 59 will rotate the parts backwardly or in the direction of the arrow *b* as shown in Figs. 13 and 20 to their normal position during which movement the star wheel 6 will move together with the shaft 1, as fully explained in reference to Figs. 13 and 14, and after all of the parts have come to rest, the spring 44 will bring the stops 41 and 43 again into engagement.

The description of the mode of operation of the particular form of applicant's invention shown in Figs. 13 and 14 in connection with an oscillatable element having been described, it will suffice to merely call attention to the points of difference in describing the operation of the modifications of applicant's invention when used in connection with an oscillatable element.

The armature of the retaining device as shown in Figs. 1 and 2 being connected rigidly to the shaft 1, must, of course, move in unison with shaft 1, and the oscillatable element 59, and has the disadvantage that with a great amount of "back lash" in the train of mechanism and a heavy element 59, it is liable to be dislodged upon the slight falling back of the element 59 as heretofore described after being moved to its upper position, on account of its inability to become independently lined up with the poles of the field while the element 59 is being moved upwardly.

The device shown in Figs. 3 and 4 is an improvement upon the device shown in Figs. 1 and 2, for the star wheel forming the armature of the retaining device has a certain amount of free movement between the pins 18 and the hub 11, so that its limbs may become "lined up" with the poles of the field just before the arm 59 is moved to its upper limit, and having once become "lined up" the falling back of the arm 59 would not so easily dislodge it. In order to improve this form of device a resilient material 20 may be placed about the studs 18, so as to partially reduce the shock caused by arm 59 falling back.

The modification shown in Figs. 5 and 6 is still another improvement upon the basic idea and the form shown in Figs. 3 and 4, for in this form of the device the springs 26 always offering a resilient means constantly acting between the hub 11 and the star wheel 6 allows less likelihood of the star wheel 6 being dislodged by the falling back of the arm 59, than does the form shown in Figs. 3 and 4.

The form of the invention as shown in Figs. 7 to 12 inclusive and which is used in connection with other features in the preferred form of the invention exhibits a still greater improvement in the construction of the device, for, in this form of the invention the motor shaft while clearing the signal does not also turn the star wheel 6, so that the limbs of the star wheel may become "lined up" with the poles of the field before the arm 59 begins to fall back. This form of the invention also has the added advantage in that the motor is relieved of the work due to turning the star wheel while moving the arm 59 to its upper position.

In electro-magnetic retaining devices as heretofore constructed the consumption of current in a given device has been irrespective of the force to be resisted. That is, in devices in which a retaining device was used, and in which it was used to withstand forces of varying value, it has always been designed to withstand the force of greatest value, although it has to withstand such force, but rarely, consequently, the device when working on a light load consumed as much current as it did on its heaviest load, a design which of course resulted in a needless waste of current, but could not be avoided. In applicant's device, however, such waste is eliminated for the current consumed varies with the force to be resisted, being large when the force is large and small when the force is small. This result is obtained in applicant's structure by reason of the fact that with a small torque the limbs of the star wheel will coincide with the poles of the field, thus forming with the field a path of small reluctance for the magnetic lines of force generated by the current flowing in the coils 51, but under such conditions the greatest resistance is present to the flow of alternating current due to the reactance caused in coil 51 by the powerful magnetic field. With a greater torque the limbs are rotated a greater or less degree out of alinement with the poles, thus increasing the air gap and so increasing the reluctance of the magnetic circuit and so decreasing the resistance to alternating current, and so allowing more current to flow. The rotative component of the magnetic lines of force has, however, increased due to the fact that the limbs of the star wheel are not in alinement with the poles of the field, so that a greater resistance to turning of the star wheel is present.

It is to be understood that although applicant's invention is most valuable when used in connection with alternating current, it is also extremely valuable when used with direct current, due to the fact, that all opportunity for the armature and field to freeze in this device has been eliminated. It is also to be understood that whereas applicant has shown and described his star wheel armature as intimately connected with the shaft of the motor, that it is not at all necessary to so connect it, for it may be made as a separate article of manufacture having a shaft of its own, which, by means of a pinion or similar means may be mechanically connected to any suitable part of the mechanism between the prime mover and the thing to be moved.

Having fully explained the principle of my invention and fully shown and described a practical physical embodiment thereof, with modifications, what I claim as new and desire to secure by Letters Patent, is:

1. In an electro-magnetic retaining device, a field of magnetic material, an armature of magnetic material, a body adapted for rotation in either direction, means connected with said body adapted for causing relative rotation between said armature and field only when said body is rotated in one direction, and means to produce a magnetic flux between said armature and field to prevent said relative rotation, said field of magnetic material and said armature formed so that there is an intervening body of air at all times between said armature and field.

2. In an electro-magnetic retaining device, a field of magnetic material, an armature of magnetic material, a body adapted for rotation in either direction, means connected with said body adapted for causing relative rotation between said armature and field only when said body is rotated in one direction, means adapted for allowing a slight movement of said body in a direction to cause relative movement between said armature and field without causing said relative movement, and means to produce a magnetic flux between said armature and field to prevent said first mentioned relative rotation, said field of magnetic material and said armature formed so that there is an intervening body of air at all times between said armature and field.

3. In an electro-magnetic retaining device, a field of magnetic material, an armature of magnetic material, a body adapted for rotation in either direction, means for rotating said body in one direction, an element adapted for oscillation, means substantially rigidly connected with said body for causing said element to move in one direction; said element operable by gravity in the other direction to cause said body to rotate in the other direction, means connected with said body adapted for causing relative rotation between said armature and field only when said body is rotated in said other direction by said oscillating member, and means to produce a magnetic flux between said armature and field to prevent said relative rotation, said field of magnetic material and said armature formed so that there is an intervening body of air at all times and solely between said armature and field.

4. In an electro-magnetic retaining device, a field of magnetic material, an armature of magnetic material, a body adapted for rotation in either direction, means for rotating said body in one direction, an element adapted for oscillation, means substantially rigidly connected with said body for causing said element to move in one direction, means connected to said oscillating element adapted when said element is fully oscillated in one direction to render inert the means for rotating said body in one direction, said element operable by gravity in the other direction and when so acting through the substantially rigid connection causing said body to rotate in the other direction, means connected with said body adapted for causing relative rotation between said armature and field in proximity one to the other when said body is rotated in said other direction by said oscillating member, and means rendered active by the oscillation of said element to its full extent in one direction by the rotation of said body in said first named direction to produce a magnetic flux between said armature and field to prevent said relative rotation and thus hold said element in its oscillated position, said armature and field being separated solely by an intervening body of air at all times.

5. In an electro-magnetic retaining device: a field of magnetic material; coils on said field; an armature of magnetic material rotatable in proximity to the said fields being separated therefrom at all times by an intervening body of air solely; an electric motor comprising an armature and a field of magnetic material having coils thereon; a shaft bearing both the said armatures; a source of current included in a circuit of which the field coils of the electric motor form a part, and in another circuit of which the coils on the first mentioned field form a part; a circuit controller common to both of said circuits; a second circuit controller included in the circuit including the field coils of the electric motor; a third circuit controller included in the circuit including the coils on the first mentioned field; an oscillatable element; connections from said shaft to said oscillatable element whereby when the common circuit controller and the said second circuit controller are in closed position current flows from the source of current to the electric motor, rotates the electric motor armature, turns the shaft, and so oscillates the oscillatable element; the said second circuit controller being moved by the oscillatable element to open position when the oscillatable element has been fully oscillated thus cutting off current to the electric motor whereupon the armature stops rotating; the third mentioned circuit controller being moved to closed position by the oscillatable element when the oscillatable element reaches the fully oscillated position whereby current flows from the source through the first mentioned field coils and a magnetic flux is generated in the first mentioned field of magnetic material which holds the said oscillatable element in moved position; said oscillatable element oscillated in another direction by gravity and through its connection causing both armatures to rotate backwardly when the common circuit controller is in open position.

6. In an electro-magnetic retaining device; a fixed field of magnetic material; means to produce a magnetic flux emanating from said field; an armature of magnetic material adapted to rotate in said magnetic flux formed with a projection; a shaft upon which said armature is revolubly mounted; a disk revolubly mounted on the shaft having a projection adapted to contact with the projection on the armature upon a movement in one direction only of the armature; a ball race fastened to the disk; balls bearing upon the ball race; an inner clutch member supporting the balls and formed with curved supporting paths in which the balls rest whereby a revolution in one direction only of the inner clutch member transmits motion to the ball race; resilient means attached to the ball race and bearing on the side of the projection on the armature opposite to that upon which the projection on the disk bears; the inner clutch member being rigidly attached to said shaft; means to cause oscillation of said shaft in one direction, said armature preventing continued movement of said shaft in the opposite direction when said magnetic flux is formed.

GERRET REKERS.

Witnesses:
LILLIAN L. PHILLIPS,
MARY A. O'NEILL.

Copies of this patent may be obtained for five cents each, by addressing the "Commissioner of Patents, Washington, D. C."